(12) United States Patent
Ishida et al.

(10) Patent No.: US 6,699,591 B2
(45) Date of Patent: Mar. 2, 2004

(54) OPTICAL INFORMATION RECORDING MEDIUM

(75) Inventors: Toshio Ishida, Kanagawa (JP); Takeshi Kakuta, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 37 days.

(21) Appl. No.: 10/158,834

(22) Filed: Jun. 3, 2002

(65) Prior Publication Data

US 2003/0082331 A1 May 1, 2003

(30) Foreign Application Priority Data

Jun. 4, 2001 (JP) .................................. 2001-168275
Jul. 3, 2001 (JP) .................................. 2001-202008

(51) Int. Cl.[7] .............................................. B32B 3/02
(52) U.S. Cl. .................. 428/641; 428/64.8; 430/270.2; 369/275.4
(58) Field of Search .............................. 428/64.1, 64.4, 428/64.8, 913; 430/270.14, 270.2, 495.1, 945; 369/375.4, 283, 288

(56) References Cited

U.S. PATENT DOCUMENTS

2003/0003261 A1 * 1/2003 Saito ........................ 428/64.4
2003/0017295 A1 * 1/2003 Ishida ....................... 428/64.4
2003/0031954 A1 * 2/2003 Kakuta ..................... 430/270.2
2003/0090990 A1 * 5/2003 Ozawa ..................... 369/275.4

FOREIGN PATENT DOCUMENTS

| JP | 11-31337 | 2/1999 |
| JP | 11-120617 | 4/1999 |
| JP | 2000-285520 | 10/2000 |
| JP | 2000-311392 | 11/2000 |

OTHER PUBLICATIONS

Schep et al., "Format Description and Evaluation of the 22.5 GB DVR Disc", International Symposium on Optical Memory 2000, Sep. 5–8, 2000, Hokkaido, Japan, Technical Digest.

* cited by examiner

*Primary Examiner*—Elizabeth Mulvaney
(74) *Attorney, Agent, or Firm*—Sughrue Mion, PLLC

(57) ABSTRACT

The present invention provides an optical information recording medium comprising a substrate including a groove that has a track pitch of 200 to 400 nm and a depth of 20 to 150 nm, the substrate having successively disposed thereon a light-reflective layer, a recording layer containing a dye and on which information is recordable by a laser beam having a wavelength of 600 nm or less, and a cover layer, wherein the recording layer contains at least two organic solvent-soluble compounds each having an absorption maximum in the range of 300 to 450 nm and a specific absorbance at a recording laser wavelength.

20 Claims, 2 Drawing Sheets

OPTICAL INFORMATION RECORDING MEDIUM

BACKGROUND OF THE INVENTION

1. Field of the Invention

The present invention relates to an optical information recording medium, and more specifically to an optical information recording medium writable only once by heat mode.

2. Description of the Related Art

A CD-R is a writable, optical information recording medium (optical disc) on which information can be written only once by irradiation with laser light, and is widely known. A CD-R typically comprises a transparent disc substrate having successively disposed thereon a recording layer including an organic dye, a light-reflective layer including a metal such as gold, and a protective layer (cover layer) made of a resin. Information is recorded on this CD-R by irradiating the CD-R with near-infrared laser light (usually laser light having a wavelength of around 780 nm). Specifically, the portion of the recording layer that is irradiated absorbs light, whereby the temperature rises at the irradiated portion. The rise in temperature produces a physical or chemical change (e.g., formation of pits) to alter the optical properties of the irradiated portion, whereby information is recorded. The information thus recorded on the CD-R is ordinarily reproduced by irradiating the CD-R with laser light having the same wavelength as that of the laser light used to record the information and detecting a difference in reflectance between the region of the recording layer whose optical properties have been changed (recorded portion) and the region of the recording layer whose optical properties have not been changed (unrecorded portion).

In recent years, there has been a demand for optical information recording media having higher density, and writable digital versatile discs (DVD-Rs) have been proposed in response to that demand (*Nikkei New Media*, extra issue entitled "DVD", 1995). A DVD-R typically comprises two transparent disc substrates that each have successively disposed thereon a recording layer containing an organic dye, a light-reflective layer, and a protective layer, with the discs being adhered so that the recording layers face inward or so that protective substrates having the same disc shape as these discs are disposed on outer sides of the adhered discs. Moreover, the transparent disc substrate includes a guide groove (pre-groove) used for tracking a laser irradiated onto the CD-R, with the groove having a narrow track pitch (0.74 to 0.8 μm) that is equal to or less than half of that in a CD-R. Information is recorded and reproduced (played back) by irradiating the DVD-R with laser light in a visible region (usually laser light having a wavelength region ranging from 630 to 680 nm), whereby information can be recorded at a higher density than a CD-R.

Recently, high-vision television and networks such as the Internet have rapidly become more widespread. In addition, the start of HDVT (High Definition Television) broadcasting is near at hand. As a result, large-capacity optical recording media capable of recording visual information easily and inexpensively are in demand. While DVD-Rs currently play a significant role as large-capacity recording media, the demand for media having greater recording capacity and higher density continues to escalate, and development of recording media that can cope with this demand is also needed. For this reason, development of recording media having ever greater storage capacity with which high-density recording can be effected with short wave light continues to advance.

Methods for recording information on and reproducing information from an optical information recording medium including a recording layer containing an organic dye, by irradiating, from the side of the medium disposed with the recording layer towards the side of the medium disposed with a light-reflecting layer, the medium with laser light having a wavelength of 530 nm or less, are disclosed in, for example, Japanese Patent Application Laid-Open (JP-A) Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818 and 2000-228028. In these methods, information is recorded on and reproduced from an optical disc having a recording layer containing a porphyrin compound, an azo-based dye, a metal azo-based dye, a quinophthalone-based dye, a trimethine cyanine dye, a dicyanobiphenyl-skeleton dye, a coumarin dye, a naphthalocyanine compound or the like, by irradiating the optical disc with a blue laser (having a wavelength of 430 nm or 488 nm) or a blue-green laser (having a wavelength of 515).

Further, in view of compatibility with CD-R systems currently employed, optical information recording media have been proposed in which information can be recorded and reproduced by two laser beams having mutually different wavelengths. For example, in JP-A Nos. 2000-141900, 2000-158816, 2000-185471, 2000-289342 and 2000-309165, there are proposed optical information recording media with which information can be recorded and reproduced using both a laser beam having a wavelength at about 780 nm in a near-infrared region and a laser beam having a wavelength at about 650 nm in a visible region, by combined use of a dye used in CD-Rs and a dye used in DVD-Rs.

However, the present inventors have found that practically employable sensitivity cannot be obtained with the discs disclosed in the above publications when information is recorded on the discs by irradiating the discs with short-wave laser beam having a wavelength of 600 nm or less, and particularly a wavelength of 450 nm or less, and that sufficient levels cannot been achieved with respect to other recording characteristics such as reflectance and modulation. In particular, it was found that recording characteristics of the optical discs disclosed in the above publications decreased when the discs were irradiated with laser light having a wavelength of 450 nm or less.

SUMMARY OF THE INVENTION

In view of the foregoing, it is an object of the present invention to provide an optical information recording medium on which information can be recorded by irradiating the medium with a short-wave laser beam having a wavelength of 600 nm or less, and that exhibits stable playback characteristics.

The object is achieved by the invention described below.

A first aspect of the invention provides an optical information recording medium comprising a substrate including a groove that has a track pitch of 200 to 400 nm and a depth of 20 to 150 nm, the substrate having successively disposed thereon a light-reflective layer, a recording layer containing a dye and on which information is recordable by a laser beam having a wavelength of 600 nm or less, and a cover layer, wherein the recording layer contains at least one organic solvent-soluble compound having an absorption maximum in the range of 300 to 450 nm and an absorbance of 0.07 or more at a recording laser wavelength, and at least one organic solvent-soluble compound having an absorption maximum in the range of 300 to 450 nm and an absorbance of lower than 0.07 at a recording laser wavelength.

A second aspect of the invention provides an optical information recording medium comprising a substrate including a groove that has a track pitch of 200 to 400 nm and a depth of 20 to 150 nm, the substrate having successively disposed thereon a light-reflective layer, a recording layer containing a dye and on which information is recordable by a laser beam having a wavelength of 600 nm or less, and a cover layer, wherein the recording layer contains at least two organic solvent-soluble compounds, each having an absorption maximum in the range of 300 to 450 nm and an absorbance of 0.07 or more at a recording laser wavelength.

DESCRIPTION OF THE PREFERRED EMBODIMENTS

Figure 1:
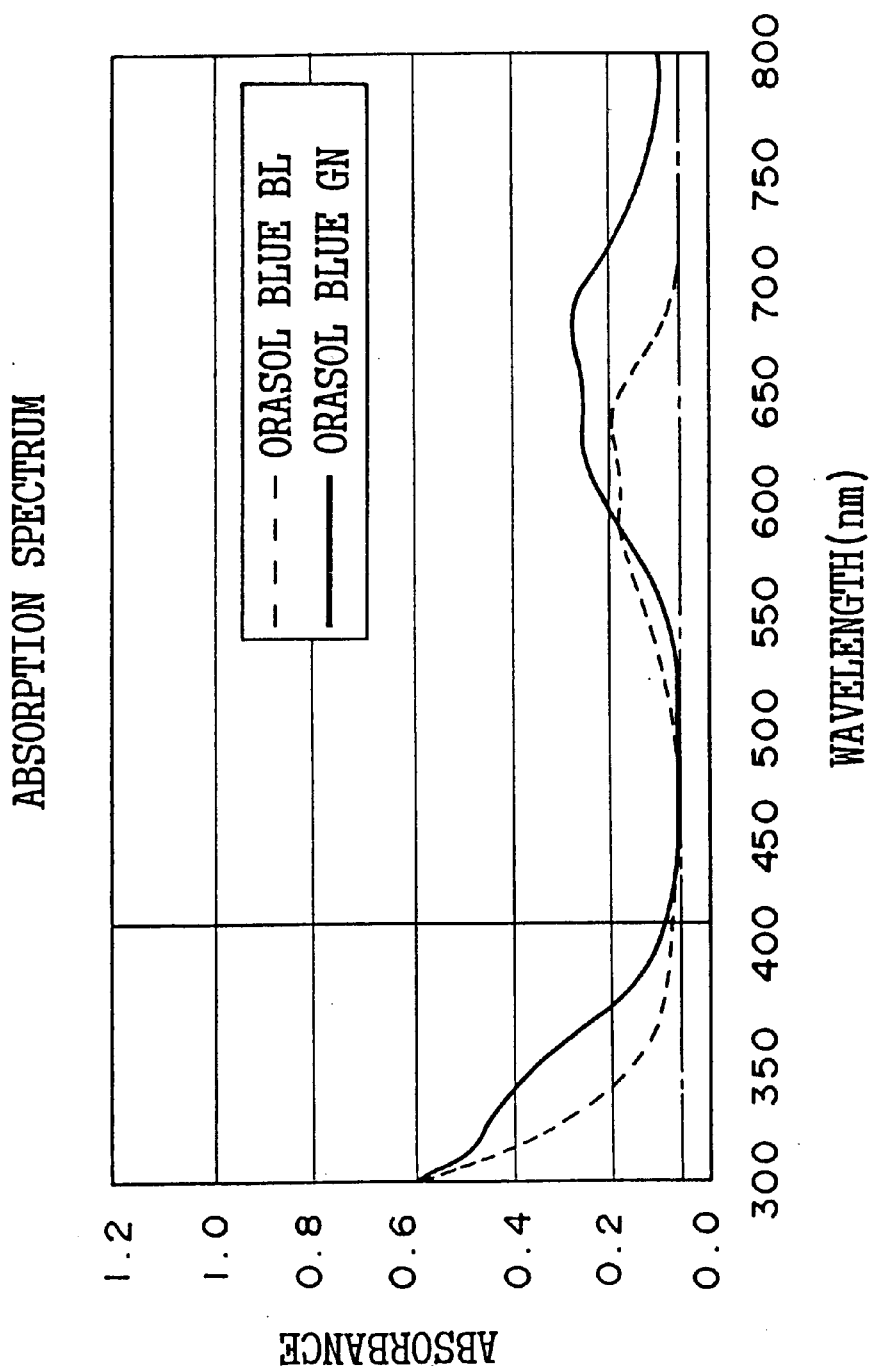
FIG. 1 is a graph illustrating absorption spectrums of a phthalocyanine compound (ORASOL BLUE GN, manufactured by Chiba Specialty Chemical Corp.) and an anthracene compound (ORASOL BLUE BL, manufactured by Chiba Specialty Chemical Corp.).

An optical information recording medium of the present invention comprises a substrate having successively disposed thereon at least a light-reflective layer, a recording layer, and a cover layer. It is preferable that the cover layer is formed via a bonding layer on the recording layer.

Substrate

Materials conventionally used for optical information recording media substrates can be arbitrarily selected and used as the material for the substrate of the invention.

Specific examples of such substrate materials include glass, polycarbonate, acrylic resins such as polymethyl methacrylate, vinyl chloride resins such as polyvinyl chloride and copolymers of vinyl chloride, epoxy resins, amorphous polyolefins, polyesters, and metals such as aluminum. If necessary, these materials may be used in combination.

Among the materials listed above, polycarbonate and amorphous polyolefins are preferable from the standpoint of moisture resistance, dimension stability, and low cost. Polycarbonate is particularly preferable. The thickness of the substrate is preferably 1.1±0.3 mm.

A guide groove for tracking or a pre-groove representing information such as address signals is formed on the substrate. In order to achieve higher storage density, it is preferable to use a substrate having a pre-groove with a track pitch that is narrower than the track pitch in a conventional CD-R or DVD-R. It is essential that the track pitch of the pre-groove is 200 to 400 nm. Preferably, the track pitch of the pre-groove is 250 to 350 nm. It is also essential that the depth of the pre-groove is 20 to 150 nm. Preferably, the depth of the pre-groove is 50 to 100 nm.

An undercoat layer is preferably disposed on the surface of the substrate at the side disposed with the light-reflective layer, in order to improve surface smoothness and enhance adhesion.

Examples of material for the undercoat layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate, and the like; and surface-modifying agents such as silane coupling agents.

The undercoat layer can be formed by preparing a coating liquid by dissolving or dispersing the above-mentioned material in a suitable solvent, and applying the coating liquid to the substrate surface by spin coating, dip coating, extrusion coating, or the like. The thickness of the undercoat layer is normally 0.005 to 20 $\mu$m and preferably 0.01 to 10 $\mu$m.

Light-Reflective Layer

A material having a high reflectance with respect to lasers is used for the light-reflective layer. It is preferable that the reflectance is 70% or more.

Examples of the light-reflective material include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. These light-reflective materials may be used singly or in combination of two or more, or alternatively as alloys. Among these materials, Cr, Ni, Pt, Cu, Ag, Au, Al, and stainless steel are preferable. Au, Ag, Al, and their alloys are more preferable. Au, Ag, and their alloys are most preferable.

The light-reflective layer can be formed by, for example, vacuum-depositing, sputtering, or ion-plating the light-reflective material on the substrate. The thickness of the light-reflective layer is normally 10 to 300 nm and preferably 50 to 200 nm.

Recording Layer

The recording layer is formed on the light-reflective layer and contains a dye. Information can be recorded on the recording layer when the recording layer is irradiated with a laser having a wavelength of 600 nm or less.

In the first aspect of the invention, examples of the dye include a combination of at least one organic solvent-soluble compound that has an absorption maximum in the range of 300 to 450 nm and an absorbance of 0.07 or more at the recording laser wavelength (hereinafter, "the organic solvent-soluble compound (A)") and at least one organic solvent-soluble compound that has an absorption maximum in the range of 300 to 450 nm and an absorbance of lower than 0.07 at the recording laser wavelength (hereinafter, "the organic solvent-soluble compound (B)").

The term "absorption maximum" refers not only to cases where the absorption exhibits a maximum in the range of 300 to 450 nm but also cases where the absorbance becomes 0.2 or more.

By mixing the organic solvent-soluble compounds (A) and (B), which have mutually different absorbances at a recording laser wavelength, at a desired mixing ratio, a mixture of compounds having different thermal absorption properties is produced. As a result, the dispersion behavior of the recording layer can be made different from that of a recording layer comprising only a single compound, whereby it becomes possible to successfully control pit formation and raise the degree of modulation.

The term "recording laser wavelength" refers to the generally defined wavelength of a laser that is irradiated on an optical information recording medium to cause decomposition of the components of the recording layer (dye layer). The actual wavelength may deviate from the generally defined wavelength by ±10 nm. For example, the wavelength is 635 nm or 650 nm in the case of a DVD and 405 nm in the case of a DVR (a high-density storage medium of 22.5 GB/disc proposed by Sony Corp.).

The term "absorbance" refers to the absorbance obtained by forming a solid film (having a thickness of, for example, 100 nm) of the organic solvent-soluble compound (A) or (B) on a flat substrate of polycarbonate and measuring the transmittance by means of a spectrophotometer (uv-3100, manufactured by Shimadzu Corporation).

The mixing ratio by mass of the organic solvent-soluble compounds (A) and (B) (i.e., (A)/(B)) is preferably 5/95 to 95/5 and more preferably 10/90 to 90/10.

If the mixing ratio is less than 5/95 or more than 95/5, the effect of using the mixture to control thermal properties becomes insignificant and may not be much different from the case where a single compound is used.

The amount of the organic solvent-soluble compound (A) included in the recording layer is preferably 5 to 95% by mass and more preferably 10 to 90% by mass.

A sufficient effect may not be exhibited if the amount is less than 5% by mass, and further effects may not be exhibited even if the content exceeds 95% by mass.

The organic solvent-soluble compound (A) is a phthalocyanine compound or a porphyrin compound, and is preferably at least one of these compounds. The phthalocyanine compound is preferably at least one of a sulfamoyl-substituted phthalocyanine compound, an alkyl-substituted phthalocyanine compound, and an alkoxy-substituted phthalocyanine compound.

The organic solvent-soluble compound (B) is phthalocyanine, anthracene, or a derivative of these compounds, and is preferably at least one of these compounds. The phthalocyanine compound is preferably at least one of a sulfamoyl-substituted phthalocyanine compound, an alkyl-substituted phthalocyanine compound, and an alkoxy-substituted phthalocyanine compound.

Examples of the anthracene compound that can be used include anthracene, a sulfamoyl-substituted anthracene compound, an alkyl-substituted anthracene compound, and an alkoxy-substituted anthracene compound.

FIG. 1 shows specific examples of the absorption spectrum of a phthalocyanine compound (ORASOL BLUE GN, manufactured by Chiba Specialty Chemical Corp.) used as the organic solvent-soluble compound (A), and the absorption spectrum of an anthracene compound (ORASOL BLUE BL, manufactured by Chiba Specialty Chemical Corp.) used as the organic solvent-soluble compound (B).

As shown in FIG. 1, the absorbances of (A) and (B) at the recording laser wavelength (405 nm) of a DVR are 0.07 and 0.06, respectively.

The effect described above is obtained by using a combination of the organic solvent-soluble compounds (A) and (B).

In the second aspect of the invention, the dye at least contains two or more organic solvent-soluble compounds, with each having an absorption maximum in the range of 300 to 450 nm and an absorbance of 0.07 or more at the recording laser wavelength.

If two or more organic solvent-soluble compounds whose absorbances at the recording laser wavelength are each 0.07 or more are incorporated, the amount of light absorption can be controlled and a high degree of modulation can be brought about.

The term "absorbance" as used herein refers to an amount indicating the proportion of light absorbed by the organic solvent-soluble compound in an amorphous state. More specifically, the value is $\log_{10}(I_0/I)$, where $I_0$, is light intensity before absorption and I is light intensity changed by absorption.

More specifically, the absorbance is obtained by the forming a solid film (having a thickness of, for example, 100 nm) of the organic solvent-soluble compound on a flat substrate of polycarbonate and measuring the transmittance by means of a spectrophotometer (uv-3100, manufactured by Shimadzu Corporation).

When the number of organic solvent-soluble compounds whose absorbances at the recording laser wavelength are each 0.07 or more is 2 and these organic solvent-soluble compounds are designated as X and Y, the mixing ratio by mass of the organic solvent-soluble compounds (i.e., X/Y) is preferably 0.1/99.9 to 99.9/0.1 and more preferably 1/99 to 99/1.

The properties of the intended compound may not be exhibited effectively if the mixing ratio is less than 0.1/99.9, and the properties of the compound may predominate if the mixing ratio exceeds 99.9/0.1.

When the number of organic solvent-soluble compounds whose absorbances at the recording laser wavelength are each 0.07 or more is 3 or more, the mixing ratio by mass of the organic solvent-soluble compound X, whose content (amount) in the recording layer is the largest, to the organic solvent-soluble compound Y, whose content in the recording layer is the smallest, must meet the above-mentioned mixing ratio by mass.

The amount of the two or more organic solvent-soluble compounds included in the recording layer is preferably 50 to 100% by mass and more preferably 70 to 100% by mass.

If the content is 50% by mass or less, absorption diminishes and there may be a drop in recording characteristics.

The organic solvent-soluble compounds in the second aspect are preferably a phthalocyanine compound, a porphyrin compound, a triazole compound, an aminobutadiene compound, and a cyanine compound. The phthalocyanine compound to be used is preferably one of an alkoxy-substituted phthalocyanine compound, a sulfonamide-substituted phthalocyanine compound, a sulfamoyl-substituted phthalocyanine compound, and a sulfonic acid-substituted phthalocyanine compound.

Figure 2:
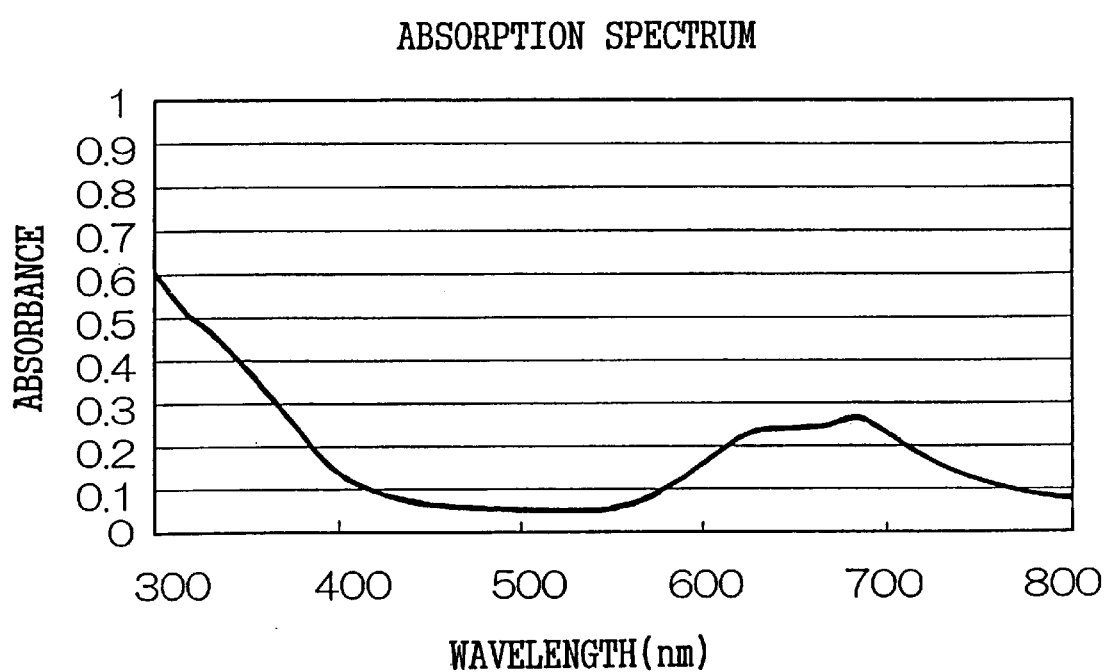
FIG. 2 is a graph illustrating an absorption spectrum of FOM-561 manufactured by Wako Pure Chemical Industries, Ltd.

FIG. 2 shows the absorption spectrum of FOM-561, which is a specific example of the organic solvent-soluble compound and is a phthalocyanine compound manufactured by Wako Pure Chemical Industries, Ltd.

As shown in FIG. 2, the absorbance at the recording laser wavelength (405 nm) of a DVR is 0.1146.

The effect described above is obtained by using two or more such organic solvent-soluble compounds.

In addition, the dyes described in JP-A Nos. 4-74690, 8-127174, 11-53758, 11-334204, 11-334205, 11-334206, 11-334207, 2000-43423, 2000-108513, and 2000-158818 can also be used in combination with the above-mentioned organic solvent-soluble compounds.

Other examples of the dye include organic compounds, such as triazole compounds, triazine compounds, cyanine compounds, merocyanine compounds, aminobutadiene compounds, phthalocyanine compounds, cinnamic acid compounds, viologen compounds, azo compounds, oxonol-benzoxazole compounds, and benzotriazole compounds. Among these compounds, cyanine compounds, aminobutadiene compounds, benzotriazole compounds, and phthalocyanine compounds are particularly preferable.

The recording layer is formed by preparing a dye coating liquid by dissolving the recording material (organic solvent-soluble compound or the like), such as the above-mentioned dye, a binder, and other additives as needed, in a suitable solvent, applying the dye coating liquid to the light-reflective layer formed on the substrate surface, and drying the layer. The concentration of the recording material in the dye coating liquid is generally 0.01 to 15% by mass, preferably 0.1 to 10% by mass, more preferably 0.5 to 5% by mass, and most preferably 0.5 to 3% by mass.

The recording material may be dissolved by, for example, heat, ultrasonic treatment, or stirring the material with a stirrer, disperser, or homogenizer.

Examples of the solvent for preparing the dye coating liquid include esters such as butyl acetate, ethyl lactate, and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as methylcyclohexane; ethers such as tetrahydrofuran, ethyl ether, and dioxane; alcohols such as ethanol, n-propanol, isopropanol, n-butanol, and diacetone alcohol; fluorine-based solvents such as 2,2,3,3-tetrafluoropropanol; and glycol ethers such as ethylene glycol monomethyl ether, ethylene glycol monoethyl ether, and propylene glycol monomethyl ether.

These solvents may be used singly or in combination of two or more by taking into consideration the solubility of the recording material to be used. The dye coating liquid may also contain additives such as an antioxidant, a UV absorber, a plasticizer, and a lubricating agent.

If a binder is used, examples of the binder include naturally occurring organic polymeric substances such as gelatin, cellulose derivatives, dextran, rosin, and rubber; and synthetic organic polymers, for example, hydrocarbon-based resins such as polyethylene, polypropylene, polystyrene, and polyisobutylene; vinyl-based resins such as polyvinyl chloride, polyvinylidene chloride, and vinyl chloride/vinyl acetate copolymers; acrylic resins such as polymethyl acrylate and polymethyl methacrylate; polyvinyl alcohol, chlorinated polyethylene, epoxy resins, butyral resins, rubber derivatives, and pre-condensates of heat-curable resins, e.g., phenol/formaldehyde resins. If the binder is used as a material for the recording layer, the amount of the binder is generally 0.01 to 50 times (by mass ratio), and preferably 0.1 to 5 times (by mass ratio), relative to the recording material. The concentration of the recording material in the coating liquid thus prepared is normally 0.01 to 10% by mass and preferably 0.1 to 5% by mass.

The dye solution may be coated by spraying, spin coating, dip coating, roll coating, blade coating, doctor roll coating, or screen printing. The recording layer may comprise a single layer or several layers. The thickness of the recording layer is normally 20 to 500 nm, preferably 30 to 300 nm, and more preferably 50 to 100 nm.

In order to raise the lightfastness of the recording layer, various kinds of anti-fading agents may be incorporated in the recording layer.

Generally, a singlet oxygen quencher is used as the anti-fading agent. Singlet oxygen quenchers already described in publications such as patent specifications can be used.

Specific examples of the singlet oxygen quencher include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492, Japanese Patent Application Publication (JP-B) Nos. 1-38680 and 6-26028, German Patent No. 350399, and *Journal of the Chemical Society of Japan*, October 1992, p. 1141.

The amount of the singlet oxygen quencher is normally 0.1 to 50% by mass, preferably 0.5 to 45% by mass, more preferably 3 to 40% by mass, and particularly preferably 5 to 25% by mass relative to the amounts of the compounds constituting the recording layer.

Bonding Layer

The bonding layer is an optional layer formed in order to raise adhesion between the recording layer and the cover layer.

A photo-curable resin is preferable as the material constituting the bonding layer. In particular, a photo-curable resin having a smaller coefficient of contraction by hardening is preferable in order to prevent warping of the disc. Examples of these photo-curable resins include UV-curable resins (UV-curable adhesives) such as "SD-640" and "SD-347" manufactured by Dainippon Ink & Chemicals, Inc. In order for the bonding layer to have elasticity, the thickness of the bonding layer is preferably 1 to 1000 $\mu$m, more preferably 5 to 500 $\mu$m, and particularly preferably 10 to 100 $\mu$m.

Cover Layer

The cover layer is formed in order to prevent water from penetrating into the interior of the optical information recording medium. The material of the cover layer is not particularly limited as long as it is transparent. The cover layer preferably comprises polycarbonate, cellulose triacetate, or the like. More preferably, the material of the cover layer is a material whose coefficient of moisture absorption under the conditions of 50% RH and 23° C. is 5% or less.

The term "transparent" means that the material is transparent enough to allow light for recording and playback to pass through the material (transmittance: 90% or more).

The cover layer is formed by preparing a coating solution by dissolving a photo-curable resin for forming the bonding layer in a suitable solvent, applying the coating liquid to the recording layer at a predetermined temperature to form a coated layer, laminating a cellulose triacetate film (TAC film), which is obtained by, for example, extrusion of plastic, to the coated layer, and irradiating the resulting laminate with light from the laminated TAC film side to thereby cure the coating layer. It is preferable that the TAC film contains an ultraviolet absorbing agent. The thickness of the cover layer is 0.01 to 0.2 mm, preferably 0.03 to 0.1 mm, and more preferably 0.05 to 0.095 mm.

In order to control viscosity, the temperature at which coating is conducted is preferably 23 to 50° C., more preferably 24 to 40° C., and most preferably 25 to 37° C.

In order to prevent the disc from warping, it is preferable that a pulse-type light irradiator (preferably a UV irradiator) is used to irradiate the coating layer with ultraviolet light. The pulse interval is preferably msec or less and more preferably $\mu$sec or less. Although the amount of light irradiated per pulse is not particularly limited, it is preferably 3 kW/cm$^2$ or less and more preferably 2 kW/cm$^2$ or less.

Although the number of irradiation times is not particularly limited, it is preferably 20 or less and more preferably 10 or less.

In the optical information recording medium of the invention, depending on the characteristics of the recording layer, a dielectric layer or a light-transmissive layer may be formed between the light-reflective layer and the recording layer. For example, if a recording layer containing the organic solvent-soluble compounds (A) and (B) is used, a light-transmissive layer may be disposed in order to improve adhesion to the recording layer; and if a phase transition recording layer is used, a dielectric layer may be disposed in order to dissipate heat.

The dielectric layer is made of a material such as an oxide, a nitride, a carbide, a sulfide, etc. comprising at least one of Zn, Si, Ti, Te, Sm, Mo, and Ge, and the material may be hybridized (e.g., $ZnS$-$SiO_2$).

Any material may be used for the light-transmissive layer as long as it has a transmittance of 90% or more at a laser wavelength. For example, the same material as that for the dielectric layer may be used.

The dielectric layer or the light-transmissive layer can be formed according to a conventionally known method. The thickness of the dielectric layer is preferably 1 to 100 nm and the thickness of the light-transmissive layer is preferably 1 to 100 nm.

EXAMPLES

The present invention is explained in more detail by way of examples given below. It should be noted that the invention is not limited to the following examples.
Mode 1

Examples 1 to 9

Grooved sides of spirally grooved polycarbonate substrates, which were obtained by injection molding and which each had a thickness of 1.2 mm and a diameter of 120 mm and had groove depth, track pitch, and width according to Table 1 (polycarbonate manufactured by Teijin Ltd., trade name: PANLITE AD5503), were sputtered with Ag so that a reflective layer having a thickness of 100 nm was formed. Next, 20 g of a mixture, which was composed of 95% by mass of ORASOL BLUE GN (phthalocyanine having an absorbance of 0.07, manufactured by Chiba Specialty Chemical Corp.) and 5% by mass of ORASOL BLUE BL (anthracene having an absorbance of 0.06, manufactured by Chiba Specialty Chemical Corp.) was dissolved in 1 L of 2,2,3,3-tetrafluoropropanol by carrying out an ultrasonic treatment for 2 hours to thereby obtain a dye coating liquid.

When the absorbances of ORASOL BLUE GN and ORASOL BLUE BL were measured, the absorption wavelengths shown in FIG. 1 were obtained.

The absorbance of ORASOL BLUE GN was obtained by forming a solid film thereof (having a thickness of 100 nm) on a flat substrate of polycarbonate and measuring the absorbance by the apparatus and condition given below. The absorbance of ORASOL BLUE BN was measured in a similar way.

Measuring apparatus: spectrophotometer (uv-3100-PC manufactured by Shimadzu Corporation)
Scanning speed: high speed
Scanning range: 300 to 800 nm
Temperature and humidity: 23° C. and 50% RH The dye coating liquid thus prepared was spin-coated on the surface of the reflective layer by varying rotational frequency from 300 to 4000 rpm at 23° C. and 50% RH to thereby form a recording layer. Then, the coating layer was kept for 1 to 4 hours at 23° C. and 50% RH. Thereafter, a UV-curable adhesive (SD-347 manufactured by Dainippon Ink and Chemicals Inc.) was spin-coated on the recording layer at a rotational frequency of 100 to 300 rpm, and the layer was overlaid with a polycarbonate sheet as a cover layer (PUREACE having a thickness of 70 μm, manufactured by Teijin Ltd.). The adhesive was then spread over the entire surface by varying rotational frequency from 300 to 4000 rpm. Thereafter, the bonding layer was cured by irradiation by ultraviolet light. In this way, the samples of Examples 1 to 9 were manufactured.

Example 10

The grooved side of the polycarbonate substrate, which was obtained by injection molding and which had the same thickness and diameter as those of the substrates of Examples 1 to 9 and had spiral grooves (having a depth of 100 nm, a width of 0.11 μm, and a track pitch of 300 nm), was sputtered with Ag so that a reflective layer having a thickness of 100 nm was formed. After that, a dielectric layer of $ZnS$—$SiO_2$ (having a thickness of 90 nm) was formed by sputtering. Next, 20 g of a mixture, which was composed of 95% by mass of FOM-561 (phthalocyanine having an absorbance of 0.1, manufactured by Wako Pure Chemical Industries, Ltd.) and 5% by mass of FOM-559 (phthalocyanine having an absorbance of 0.06, manufactured by Wako Pure Chemical Industries, Ltd.) was dissolved in 1 L of dibutyl ether by carrying out an ultrasonic treatment for 2 hours to thereby obtain a dye coating liquid. The dye coating liquid thus prepared was spin-coated on the surface of the dielectric layer by varying rotational frequency from 300 to 4000 rpm at 23° C. and 50% RH. Then, the coated layer was kept for 1 hour at 23° C. and 50% RH. Thereafter, a light-transmissive layer of $SiO_2$ (having a thickness of 90 nm) was formed by sputtering. Next, a UV-curable adhesive (SD-661 manufactured by Dainippon Ink and Chemicals Inc.) was spin-coated on the layer at a rotational frequency of 100 to 300 rpm and the layer was overlaid with a benzotriazole-containing polycarbonate sheet as a cover layer (PUREACE having a thickness of 80 μm, manufactured by Teijin Ltd.). The adhesive was then spread over the entire surface by varying rotational frequency from 300 to 4000 rpm. Thereafter, the bonding layer was cured by ultraviolet pulse irradiation using an ultraviolet lamp. In this way, a sample was manufactured.

Comparative Example 1

The grooved side of the polycarbonate substrate, which was obtained by injection molding and which had the same thickness and diameter as those of the substrates of Examples 1 to 9 and had spiral grooves (having a depth of 100 nm, a width of 0.11 μm, and a track pitch of 300 nm), was sputtered with Ag so that a reflective layer having a thickness of 100 nm was formed. Next, 20 g of ORASOL BLUE BL (having an absorbance of 0.06) was dissolved in 1 L of 2,2,3,3-tetrafluoropropanol by carrying out an ultrasonic treatment for 2 hours to thereby obtain a dye coating liquid. The dye coating liquid thus prepared was spin-coated on the surface of the reflective layer by varying rotational frequency from 300 to 4000 rpm at 23° C. and 50% RH to thereby form a recording layer. Then, the coated layer was kept for 1 hour at 23° C. and 50% RH. Next, a UV-curable adhesive (SD-347, manufactured by Dainippon Ink and Chemicals Inc.) was spin-coated on the layer at a rotational frequency of 100 to 300 rpm and the layer was overlaid with a polycarbonate sheet as a cover layer (PUREACE having a thickness of 80 μm, manufactured by Teijin Ltd.). The adhesive was then spread over the entire surface by varying rotational frequency from 300 to 4000 rpm. Thereafter, the bonding layer was cured by ultraviolet pulse irradiation using an ultraviolet lamp. In this way, a sample was manufactured.

Comparative Example 2

The grooved side of the polycarbonate substrate, which was obtained by injection molding and which had the same thickness and diameter as those of the substrates of Examples 1 to 9 and had spiral grooves (having a depth of 100 nm, a width of 0.11 μm, and a track pitch of 300 nm), was sputtered with Ag so that a reflective layer having a thickness of 100 nm was formed. Next, 20 g of ORASOL BLUE BL (having an absorbance of 0.06) was dissolved in 1 L of 2,2,3,3-tetrafluoropropanol by carrying out an ultrasonic treatment for 2 hours to thereby prepare a dye coating liquid. The dye coating liquid thus prepared was spin-coated on the surface of the reflective layer by varying rotational frequency from 300 to 4000 rpm at 23° C. and 50% RH to thereby form a recording layer. Then, the coated layer was kept for 1 hour at 23° C. and 50% RH. Next, a UV-curable adhesive (SD-347, manufactured by Dainippon Ink and Chemicals Inc.) was spin-coated on the layer at rotational frequency of 100 to 300 rpm and the layer was overlaid with a polycarbonate sheet as a cover layer (PUREACE having a thickness of 80 μm, manufactured by Teijin Ltd.). The adhesive was then spread over the entire surface layer by varying rotational frequency from 300 to 4000 rpm. Thereafter, the bonding layer was hardened by ultraviolet pulse irradiation using an ultraviolet lamp. In this way, a sample was manufactured.

Evaluation of Optical Information Recording Media

The optical information recording media were evaluated by recording and playing back the media obtained in Examples 1 to 10 and Comparative Examples 1 and 2. The evaluation was conducted as follows.

By using DDU-1000 (manufactured by PULSETECH Corp.) capable of emitting a laser having a wavelength of 405 nm, 3T-14T signals were recorded in the above-mentioned optical information recording media and the overall jitter was measured. The results are shown in Table 1.

TABLE 1

| | Groove depth nm | Track pitch (nm) | Width (μm) | Jitter (%) |
|---|---|---|---|---|
| Example 1 | 30 | 300 | 0.11 | 10 |
| Example 2 | 40 | 300 | 0.11 | 9 |
| Example 3 | 70 | 300 | 0.11 | 9 |
| Example 4 | 100 | 300 | 0.11 | 8 |
| Example 5 | 150 | 300 | 0.11 | 9 |
| Example 6 | 20 | 300 | 0.11 | 10 |
| Example 7 | 100 | 200 | 0.08 | 10 |
| Example 8 | 100 | 400 | 0.23 | 11 |
| Example 9 | 100 | 400 | 0.27 | 12 |
| Example 10 | 100 | 300 | 0.11 | 11 |
| Comparative Example 1 | 100 | 300 | 0.11 | recording impossible |
| Comparative Example 2 | 100 | 300 | 0.11 | 20 |

From Table 1, it can be seen that the jitter of Examples 1 to 10 was lower than the jitter of Comparative Examples 1 and 2. That is, the use of a combination of a phthalocyanine having an absorbance of 0.07 or more and a phthalocyanine having an absorbance of lower than 0.07 enables control of decomposition characteristics of dyes to be improved so that beautiful pits are formed and jitter is lowered.

Mode 2

Examples 11 to 19

Grooved sides of spirally grooved polycarbonate substrates, which were obtained by injection molding and which each had a thickness of 1.2 mm and a diameter of 120 mm and had groove depth, track pitch, and width according to Table 2 (polycarbonate manufactured by Teijin Ltd., trade name: PANLITE AD5503), were sputtered with Ag so that a reflective layer having a thickness of 100 nm was formed. Next, 20 g of a mixture, which was composed of 95% by mass of ORASOL BLUE GN (phthalocyanine having an absorbance of 0.07, manufactured by Chiba Specialty Chemical Corp.) and 5% by mass of FOM-561 (phthalocyanice having an absorbance of 0.1, manufactured by Wako Pure Chemical Industries, Ltd.) was dissolved in 1 L of 2,2,3,3-tetrafluoropropanol by carrying out an ultrasonic treatment for 2 hours to thereby obtain a dye coating liquid.

The absorbance of ORASOL BLUE GN was obtained by forming a solid film thereof (having a thickness of 100 nm) on a flat substrate of polycarbonate and measuring the absorbance by the same apparatus and condition as those employed in Example 1. The absorbance of FOM-561 was measured in a similar way.

The dye coating liquid thus prepared was spin-coated on the surface of the reflective layer by varying rotational frequency from 300 to 4000 rpm at 23° C. and 50% RH to thereby form a recording layer. Then, the coated layer was kept for 1 hour at 23° C. and 50% RH. Thereafter, a UV-curable adhesive (SD-347 manufactured by Dainippon Ink and Chemicals Inc.) was spin-coated on the recording layer at a rotational frequency of 100 to 300 rpm and the layer was overlaid with a polycarbonate sheet as a cover layer (PUREACE having a thickness of 70 μm, manufactured by Teijin Ltd.). The adhesive was then spread over the entire surface by varying rotational frequency from 300 to 4000 rpm. Thereafter, the bonding layer was cured by ultraviolet light irradiation using an ultraviolet lamp. In this way, a sample was manufactured.

Comparative Example 3

The grooved side of the polycarbonate substrate (polycarbonate manufactured by Teijin Ltd., trade name: PANLITE AD5503), which was obtained by injection molding and which had the same thickness and diameter as those of the substrates of Examples 11 to 19 and had spiral grooves (having a depth of 100 nm, a width of 0.11 μm, and a track pitch of 300 nm), was sputtered with Ag so that a reflective layer having a thickness of 100 nm was formed. Next, 20 g of ORASOL BLUE GN (having an absorbance of 0.07) was dissolved in 1 L of 2,2,3,3-tetrafluoropropanol by carrying out ultrasonic treatment for 2 hours to thereby obtain a dye coating liquid. The dye coating liquid thus prepared was spin-coated on the layer by varying rotational frequency from 300 to 4000 rpm at 23° C. and 50% RH. Then, the coating layer was kept for 1 hour at 23° C. and 50% RH. Next, a UV-curable adhesive (SD-347 manufactured by Dainippon Ink and Chemicals Inc.) was spin-coated on the layer at a rotational frequency of 100 to 300 rpm and the layer was overlaid with a polycarbonate sheet (PUREACE having a thickness of 80 μm, manufactured by Teijin Ltd.). The adhesive was then spread over the entire surface by varying rotational frequency from 300 to 4000 rpm. Thereafter, the bonding layer was cured by ultraviolet pulse irradiation using an ultraviolet lamp. In this way, a sample was manufactured.

Comparative Example 4

The grooved side of the polycarbonate substrate, which was obtained by injection molding and which had the same thickness and diameter as those of the substrates of Examples 11 to 19 and had spiral grooves (having a depth of 100 nm, a width of 0.11 μm, and a track pitch of 300 nm), was sputtered with Ag so that a reflective layer having a thickness of 100 nm was formed. Next, 20 g of FOM-561 (having an absorbance of 0.1) was dissolved in 1 L of 2,2,3,3-tetrafluoropropanol by carrying out ultrasonic treatment for 2 hours to thereby obtain a dye coating liquid. The dye coating liquid thus prepared was spin-coated on the layer by varying rotational frequency from 300 to 4000 rpm at 23° C. and 50% RH. Then, the coated layer was kept for 1 hour at 23° C. and 50% RH. Next, a UV-curable adhesive (SD-347 manufactured by Dainippon Ink and Chemicals Inc.) was spin-coated on the layer at a rotational frequency of 100 to 300 rpm and the layer was overlaid with a polycarbonate sheet (PUREACE having a thickness of 80 μm, manufactured by Teijin Ltd.). The adhesive was then spread over the entire surface by varying rotational frequency from 300 to 4000 rpm. Thereafter, the bonding layer was cured by ultraviolet pulse irradiation using an ultraviolet lamp. In this way, a sample was manufactured.

Evaluation of Optical Information Recording Media

The optical information recording media were evaluated by recording and playing back the media obtained in Examples 11 to 19 and Comparative Examples 3 and 4. The evaluation was conducted as follows.

By using DDU1000 (manufactured by PULSETECH Corp.) capable of emitting a laser having a wavelength of 405 nm, 3T-14T signals were recorded by a recording power of 5 mW in the above-mentioned optical information recording media and the overall degree of modulation and reflectance were measured. The results are shown in Table 2.

TABLE 2

| | Groove depth (nm) | Track pitch (nm) | Width (μm) | Degree of modulation (%) | Reflectance (%) |
|---|---|---|---|---|---|
| Example 11 | 30 | 300 | 0.11 | 42 | 52 |
| Example 12 | 40 | 300 | 0.11 | 49 | 54 |
| Example 13 | 70 | 300 | 0.11 | 51 | 59 |
| Example 14 | 100 | 300 | 0.11 | 48 | 62 |
| Example 15 | 150 | 300 | 0.11 | 45 | 60 |
| Example 16 | 160 | 300 | 0.11 | 40 | 58 |
| Example 17 | 100 | 200 | 0.08 | 47 | 57 |
| Example 18 | 100 | 500 | 0.23 | 46 | 55 |
| Example 19 | 100 | 600 | 0.22 | 44 | 50 |
| Comparative Example 3 | 100 | 300 | 0.11 | 35 | 55 |
| Comparative Example 4 | 100 | 300 | 0.11 | 30 | 15 |

As can be seen from Table 2, Examples 11 to 19 exhibit a higher degree of modulation relative to Comparative Examples 3 and 4. That is, the use of a combination of two or more organic solvent-soluble compounds each having an absorbance of 0.07 or more at the recording laser wavelength enables satisfactory control of the accumulation of heat by laser and enhancement of degree of modulation.

It can also be seen that controlling absorbance makes it possible to maintain a high reflectance.

Accordingly, information can be recorded on the optical information recording medium of the invention by irradiating the medium with even a short-wave laser having a wavelength of 600 nm or less. Moreover, the optical information recording medium of the invention exhibits stable recording and playback characteristics.

What is claimed is:

1. An optical information recording medium comprising a substrate including a groove that has a track pitch of 200 to 400 nm and a depth of 20 to 150 nm, the substrate having successively disposed thereon a light-reflective layer, a recording layer containing a dye and on which information is recordable by a laser beam having a wavelength of 600 nm or less, and a cover layer,
wherein the recording layer contains
at least one organic solvent-soluble compound having an absorption maximum in the range of 300 to 450 nm and an absorbance of 0.07 or more at a recording laser wavelength, and
at least one organic solvent-soluble compound having an absorption maximum in the range of 300 to 450 nm and an absorbance of lower than 0.07 at a recording laser wavelength.

2. The optical information recording medium according to claim 1, wherein
the at least one organic solvent-soluble compound having the absorbance of 0.07 or more at a recording laser wavelength is a phthalocyanine compound, and
the at least one organic solvent-soluble compound having the absorbance of lower than 0.07 at a recording laser wavelength is a phthalocyanine compound or an anthracene compound.

3. The optical information recording medium according to claim 1, wherein the phthalocyanine compound is at least one of a sulfamoyl-substituted phthalocyanine compound, an alkyl-substituted phthalocyanine compound, and an alkoxy-substituted phthalocyanine compound.

4. The optical information recording medium according to claim 1, wherein the organic solvent-soluble compound having the absorbance of 0.07 or more at a recording laser wavelength is included in the recording layer at 5 to 95% by mass.

5. The optical information recording medium according to claim 1, wherein the organic solvent-soluble compound having the absorbance of 0.07 or more at a recording laser wavelength is included in the recording layer at 10 to 90% by mass.

6. The optical information recording medium according to claim 1, wherein the dye is at least one selected from the group consisting of a triazole compound, a triazine compound, a cyanine compound, a merocyanine compound, an aminobutadiene compound, a phthalocyanine compound, a cinnamic acid compound, a viologen compound, an azo compound, an oxonolbenzoxazole compound and a benzotriazole compound.

7. The optical information recording medium according to claim 1, wherein the light-reflective layer contains a light-reflective substance selected from the group consisting of Cr, Ni, Pt, Cu, Ag, Au, Al and stainless steel.

8. The optical information recording medium according to claim 1, wherein the recording layer contains an anti-fading agent.

9. The optical information recording medium according to claim 8, wherein the anti-fading agent is a singlet oxygen quencher.

10. The optical information recording medium according to claim 1, wherein a bonding layer is disposed between the recording layer and the cover layer.

11. The optical information recording medium according to claim 1, wherein a dielectric layer or a light-transmissive layer is disposed between the light-reflective layer and the recording layer.

12. The optical information recording medium according to claim 11, wherein the dielectric layer contains an oxide, a nitride, a carbide, or a sulfide of any one of Zn, Si, Ti, Te, Sm, Mo and Ge.

13. The optical information recording medium according to claim 1, wherein the recording laser wavelength is 405 nm.

14. An optical information recording medium comprising a substrate including a groove that has a track pitch of 200 to 400 nm and a depth of 20 to 150 nm, the substrate having successively disposed thereon a light-reflective layer, a recording layer containing a dye and on which information is recordable by a laser beam having a wavelength of 600 nm or less, and a cover layer,
   wherein the recording layer contains at least two organic solvent-soluble compounds, each having an absorption maximum in the range of 300 to 450 nm and an absorbance of 0.07 or more at a recording laser wavelength.

15. The optical information recording medium according to claim 14, wherein the organic solvent-soluble compound having the absorbance of 0.07 or more at a recording laser wavelength is selected from the group consisting of a phthalocyanine compound, a porphyrin compound, a triazole compound, an aminobutadiene compound and a cyanine compound.

16. The optical information recording medium according to claim 15, wherein the phthalocyanine compound is at least one of an alkoxy-substituted phthalocyanine compound, a sulfonamide-substituted phthalocyanine compound, a sulfamoyl-substituted phthalocyanine compound and a sulfonic acid-substituted phthalocyanine compound.

17. The optical information recording medium according to claim 14, wherein the organic solvent-soluble compound having the absorbance of 0.07 or more at a recording laser wavelength is included in the recording layer at 50 to 100% by mass.

18. The optical information recording medium according to claim 14, wherein the light-reflective layer contains a light-reflective substance selected from the group consisting of Cr, Ni, Pt, Cu, Ag, Au, Al and stainless steel.

19. The optical information recording medium according to claim 14, wherein a dielectric layer or a light-transmissive layer is disposed between the light-reflective layer and the recording layer.

20. The optical information recording medium according to claim 14, wherein the recording laser wavelength is 405 nm.

* * * * *